United States Patent
Luxon (12)

(10) Patent No.: US 6,176,393 B1
(45) Date of Patent: Jan. 23, 2001

(54) SEED METER FOR SMALL GRAIN

(75) Inventor: Gary Deloy Luxon, Moline, IL (US)

(73) Assignee: Deere & Company, Moline, IL (US)

( * ) Notice: Under 35 U.S.C. 154(b), the term of this patent shall be extended for 0 days.

(21) Appl. No.: 09/338,247

(22) Filed: Jun. 22, 1999

(51) Int. Cl.[7] .................................................. B23Q 7/04
(52) U.S. Cl. ............................................ 221/211; 111/185
(58) Field of Search .................................... 221/211, 278, 221/254, 266; 111/77, 185, 183

(56) References Cited

U.S. PATENT DOCUMENTS

| | | |
|---|---|---|
| 4,793,511 | 12/1988 | Ankum et al. ........................ 221/211 |
| 4,836,412 | 6/1989 | Webber et al. ........................ 221/211 |
| 5,392,707 | * 2/1995 | Romans ................................ 111/185 |
| 5,501,366 | * 3/1996 | Fiorido ................................. 221/211 |

* cited by examiner

Primary Examiner—Kenneth W. Noland

(57) ABSTRACT

A circular seed disc is provided with a series of circumferentially arranged seed attracting apertures. The disc has a seed receiving side which is in contact with the seeds. The seed receiving side of the disc is provided with a screen which covers the seed attracting. The screen is configured as a ring and maybe releasably secured in circular grooves adjacent to the apertures by a flexible and resilient spline, or the screen maybe fixedly attached on the surface of the disc.

8 Claims, 4 Drawing Sheets

SEED METER FOR SMALL GRAIN

BACKGROUND OF THE INVENTION

1. Field of the Invention

The invention is directed to a vacuum seed meter for use with small grain having a screen located on the seed receiving side of a rotatable seed disc adjacent to seed attracting apertures.

2. Description of the Prior Art

Seed meters are used by agricultural seeding machines to control the rate at which seed is applied to a field. Seed meters for agricultural seeding machines can be divided into mechanical meters and air pressure meters. Mechanical meters use brushes, cups and/or finger pickups to single the seed. Air pressure seed meters use either positive or negative air pressure to direct seed to apertures formed in a rotating seed disc. The apertures are slightly smaller than the seed to be metered. The seed is attracted to the apertures by the passage of air therethrough and held in place by the air pressure. A sealing structure on the seed meter maybe used to isolate a portion of the rotatable seed disc so that the seed is released from the disc and falls out the outlet to the ground.

Air pressure seed meters are typically provided with plastic seed discs. These seed a discs encounter problems in metering smaller seeds such as wheat. Small grains require hundreds of small holes to obtain typical planting populations. These small holes plug easily with debris since the disc does not flex and the length of the hole is longer than the hole diameter. One solution has been proposed in U.S. Pat. No. 5,392,707 wherein a screen is inserted between two discs to form a seed disc.

SUMMARY OF THE INVENTION

It is an object of the present invention to provide a seed disc which can be used in small grain having a screen attached to the seed receiving side of the seed disc.

A circular seed disc is provided with a series of circumferentially arranged seed attracting apertures. The apertures pass through the disc. The disc has a seed receiving side which is in contact with the seeds, and a vacuum side opposite the seed receiving side. The seed receiving side of the disc is provided with a screen which covers the seed attracting apertures. The screen is configured as a ring and maybe releasably secured in circular grooves adjacent to the apertures by a flexible and resilient spline, or the screen maybe fixedly attached on the surface of the seed receiving side of the disc.

DESCRIPTION OF THE PREFERRED EMBODIMENT

Figure 1:
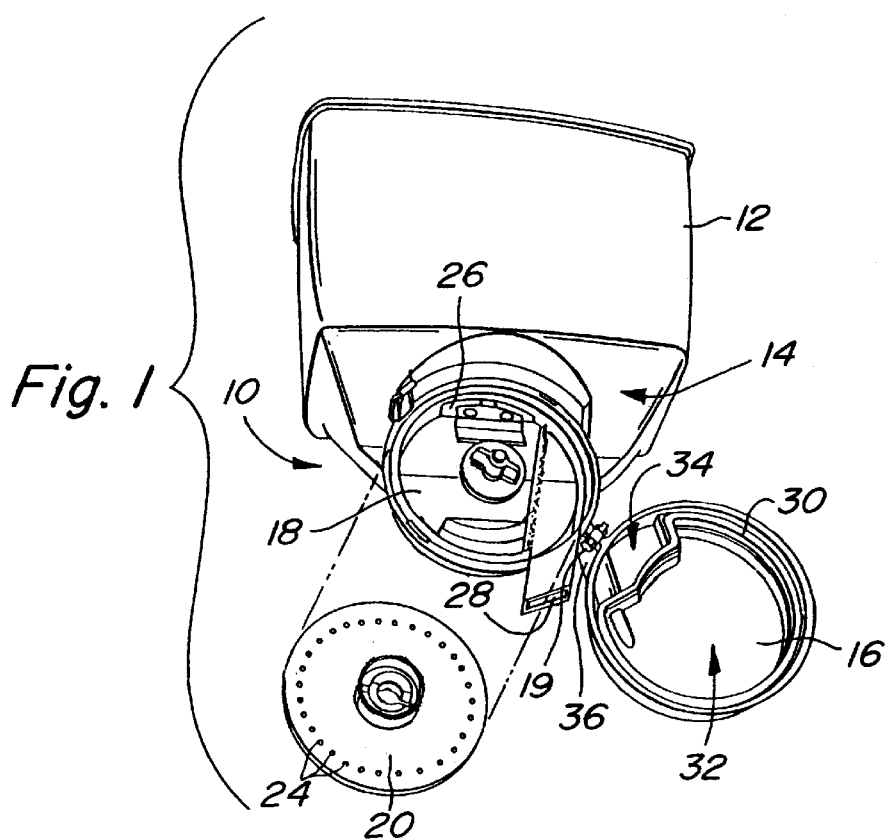
FIG. 1 is an exploded perspective view of a seed meter.
Figure 2:
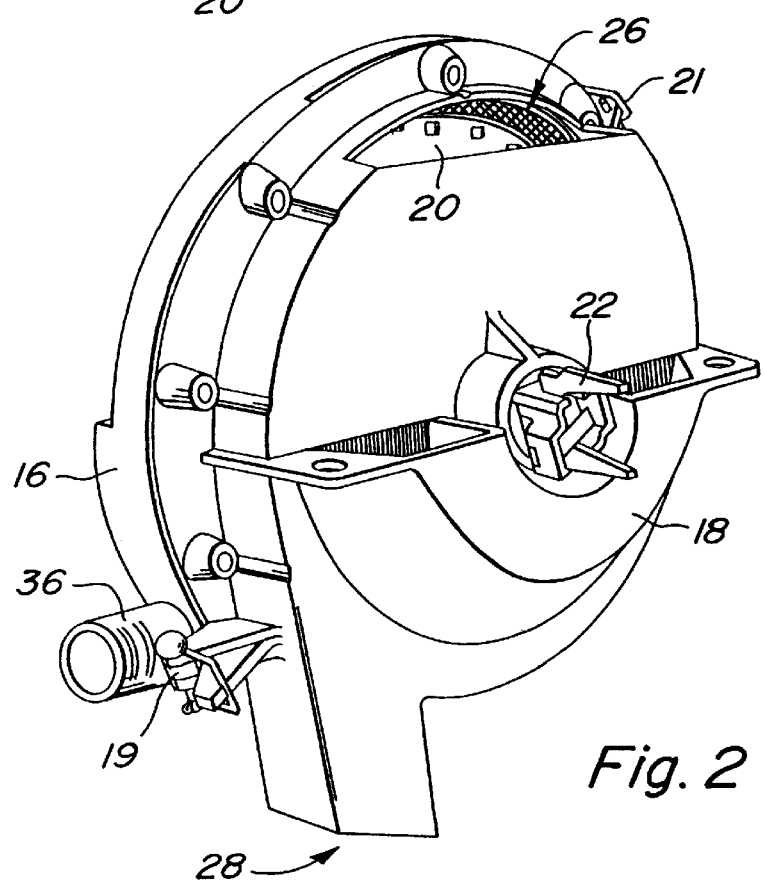
FIG. 2 is a perspective view of the seed meter.

FIG. 1 is an exploded view of a seed meter 10 having a seed hopper 12 attached thereto. The seed meter comprises a housing 14 in which is housed a rotatable seed disc 20. The housing 14 has a vacuum side 16 and a seed receiving side 18 which are hinged together at 19. The housing sides 16 and 18 are releasably latched together by latch 21. The rotatable seed disc 20 is rotated by a drive coupled to transmission coupling 22.

The seed disc is provided with a series of circumferentially arranged seed attracting apertures 24 for attracting seeds to the seed disc as it passes through a seed puddle located in the seed receiving side 18 of the housing 14. The seed receiving side 18 is provided with an inlet 26 connecting the interior of the seed meter 10 to the interior of the hopper 12 and an outlet 28 connecting to the interior of the seed meter 10 to a seed tube, not shown. The vacuum side 16 of the seed meter 10 is provided with a seal 30 which defines a seed capture zone 32 in which the vacuum in the vacuum side is applied to the apertures 24 in the seed disc 20, and a seed release zone 34 where the vacuum is isolated from the apertures 24 releasing the seeds trapped on the disc 20. The vacuum side is also provided with a pneumatic coupling 36 for coupling the vacuum side 16 to a vacuum source. Although the present invention is being described as being used on a vacuum or negative air pressure seed meter it could also be used on a positive air pressure seed meter.

Figure 3:
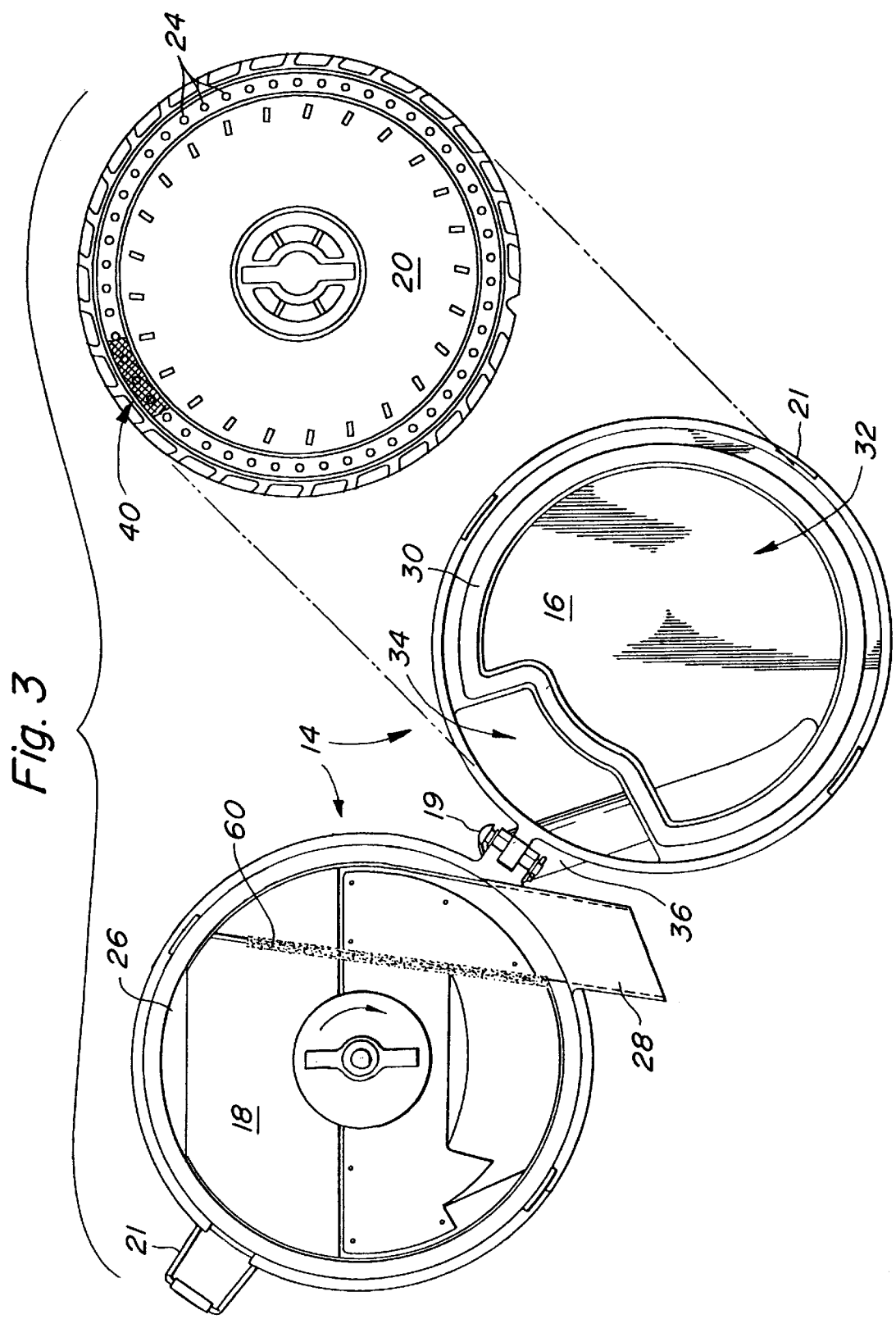
FIG. 3 is an exploded side view of a seed meter.
Figure 4:
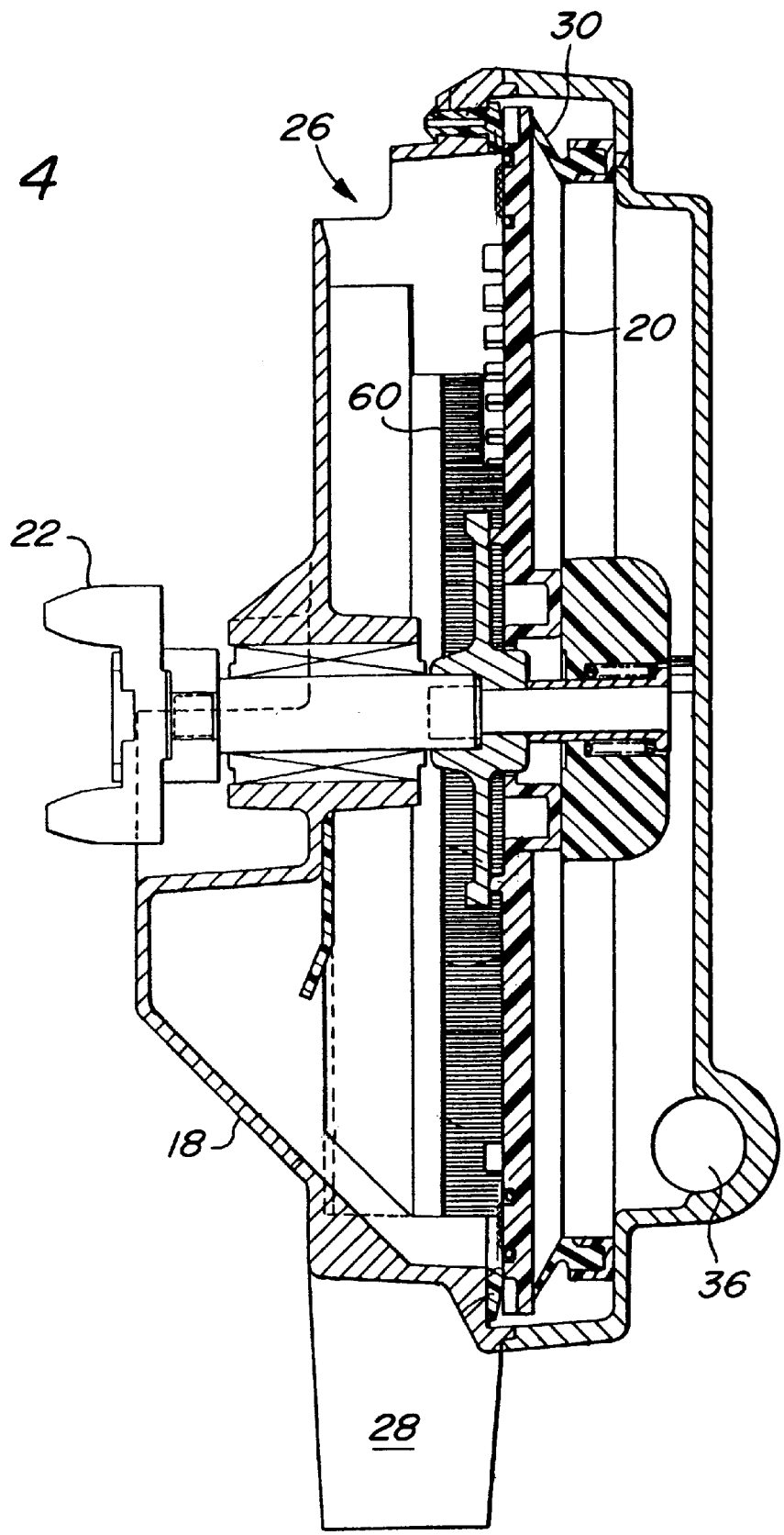
FIG. 4 is a cross sectional view of the seed meter.
Figure 5:
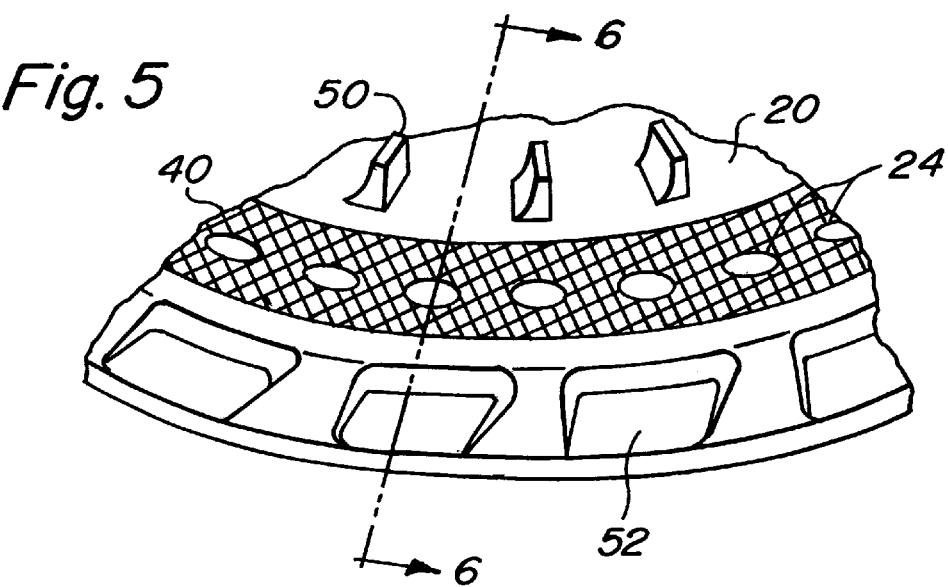
FIG. 5 is a partial perspective view of the seed disc.
Figure 6:
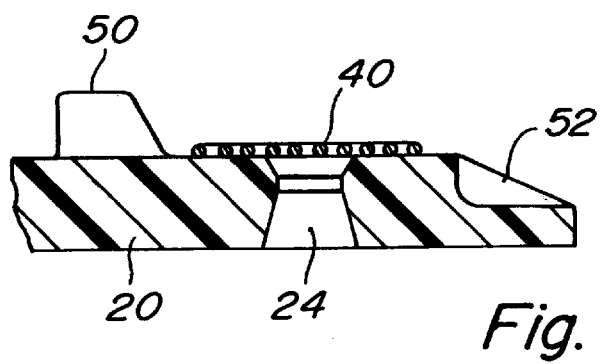
FIG. 6 is a partial cross sectional view of the seed disc.
Figure 7:
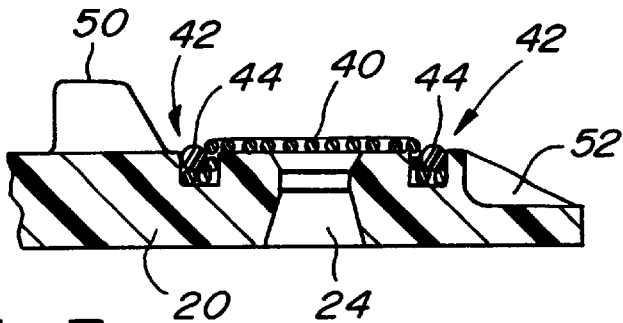
FIG. 7 is a partial cross sectional view of another embodiment of the seed disc.

The rotatable seed disc 20 is provided with a stainless steel screen 40 covering the seed attracting apertures 24. The screen 40, as illustrated in FIG. 3 is configured as a ring. The screen 40 maybe mounted to the plastic seed disc 20 in one of two ways. The first, illustrated in FIG. 6, comprises fixedly attaching the screen 40 to the seed receiving side of the seed disc 20. This can be accomplished by adhesives or by hot stacking the screen into the disc. In hot stacking a hot tool is used to press portions of the screen onto the flat plastic disc. The hot tool could press the entire inner and outer diameters into the plastic seed disc. In an alternate mounting assembly, the screen is releasably secured to the seed disc by mounting the screen in two circular grooves 42 by flexible and resilient spline 44 in a manner similar to attaching a screen to a screen frame.

The seed receiving side of the seed disc 20 is also provided with a plurality of circumferentially arranged outwardly extending protuberances 50 for stirring the seed puddle as the disc rotates in housing 14. Further more the outer circumferential edge of the seed disc 20 is provided with depressions 52 which also agitate and stir the seed as they pass through the seed puddle during rotation of the disc.

During planting seed is deposited into seed hopper 12. The seed flows downward from the hopper 12 through inlet 26 into the seed receiving side 18 of the housing 14. The seed forms a puddle at the bottom of the housing defined by the seed disc 20, the seed receiving side 18 casing, and brush 60. The brush forms a barrier in the housing 14 that prevents seeds in the seed puddle from directly entering the outlet 28, thereby short circuiting the seed meter 10. A vacuum is applied to the seed trapping zone 32 on the vacuum side 16 through pneumatic connection 36. The vacuum draws air from the seed receiving side through seed attracting apertures 24. This flow of air attracts seeds to the aperture and holds the seeds on the screen. Further rotation takes the seed out of the area defined by the seed trapping zone to the seed release zone defined by seal 30. No vacuum exists in the seed release zone and as such the seed is released from the seed disc and fall into outlet 28. From the outlet the seed is directed through a seed tube to the planting furrow.

The invention should not be limited by the above-described embodiments, but should be limited solely by the claims that follow:

I claim:

1. A seed meter for an agricultural machine, the seed meter comprising:

a housing having an inlet for receiving seed, an outlet through which metered seed is dispensed, and a pneumatic connection for receiving air pressure;

a rotatable seed disc is positioned in the housing, the seed disc is provided with circumferentially arranged apertures, air pressure from the pneumatic connection attracts seeds to the apertures, the seed disc is provided with a seed receiving side which is in communication with the inlet;

a seal is located between the housing and the seed disc, the seal defines a seed capture zone and a seed release zone, in the seed capture zone air pressure from the pneumatic connection traps seed on the seed receiving side of the disc, in the seed release zone the air pressure is isolated from the seed disc releasing seeds trapped on the disc so the seed can exit the housing through the outlet; and a screen having holes smaller than the apertures is located over the apertures on the seed receiving side of the seed disc for trapping seed adjacent.

2. A seed meter as defined by claim 1 wherein the seed meter is a vacuum seed meter and negative air pressure is applied to the pneumatic connection.

3. A seed meter as defined by claim 2 wherein the housing has a seed receiving side and a vacuum side with the pneumatic connection being located on the vacuum side.

4. A seed meter as defined by claim 3 wherein the seed receiving side of the housing is provided with the outlet and the inlet and is opposite the seed receiving side of the seed disc.

5. A seed meter as defined by claim 4 wherein the screen is configured as a ring that covers the circumferentially arranged seed attracting apertures.

6. A seed meter as defined by claim 5 wherein the screen is fixedly attached to the seed disc.

7. A seed meter as defined by claim 5 wherein the screen is releasably secured in circular grooves in the seed disc by flexible and resilient spline.

8. A seed disc for a vacuum seed meter, the seed disc comprising a circular disc having a plurality of circumferentially arranged seed attracting apertures, the seed disc having a seed receiving side that comes into contact with seed and a vacuum side to which a vacuum is applied, the seed receiving side is provided with a screen that overlays the seed attracting apertures, wherein the screen is configured as a ring that covers the circumferentially arranged seed attracting apertures and is releasably secured in circular grooves in the seed disc by flexible and resilient spline.

* * * * *